(12) United States Patent  
Grois et al.

(10) Patent No.: US 6,434,316 B1
(45) Date of Patent: Aug. 13, 2002

(54) FIBER OPTIC CONNECTOR

(75) Inventors: Igor Grois, Northbrook; Byung Kim, Chicago; Thomas R. Marrapode, Naperville, all of IL (US); Jeffrey A. Matasek, Cedarburg, WI (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 09/602,956

(22) Filed: Jun. 23, 2000

(51) Int. Cl.$^7$ ................................................ G02B 6/00
(52) U.S. Cl. .......................... 385/139; 439/731; 439/470
(58) Field of Search .................... 385/139, 59, 134–8; 439/731, 470, 701, 465, 687, 684, 689, 696

(56) References Cited

U.S. PATENT DOCUMENTS

| | | | | |
|---|---|---|---|---|
| 3,907,397 A | * | 9/1975 | Damon | 439/466 |
| 4,606,596 A | * | 8/1986 | Whiting et al. | 439/465 |
| 5,227,957 A | * | 7/1993 | Deters | 361/686 |
| 5,611,010 A | * | 3/1997 | Shiino et al. | 385/53 |
| 5,754,725 A | | 5/1998 | Kuder et al. | 385/145 |
| 5,778,122 A | | 7/1998 | Giebel et al. | 385/55 |
| 5,845,028 A | * | 12/1998 | Smith et al. | 385/59 |
| 5,915,055 A | | 6/1999 | Bennett et al. | 385/59 |
| 5,938,481 A | * | 8/1999 | Okabe et al. | 439/748 |
| 6,165,012 A | * | 12/2000 | Abe et al. | 439/596 |

OTHER PUBLICATIONS

Siecor Recommended Procedure (SRP–000–081) Issue 3, Apr. 1995, pp. 1 through 7.
FiberWare, Inc. product specification (2 pages) regarding tube splitter kit (Undated).
Lucent Technologies publication (2 pages) regarding Fiber Optic Fanouts Copyright 1996.

* cited by examiner

Primary Examiner—Brian Sircus
Assistant Examiner—Brian S. Webb
(74) Attorney, Agent, or Firm—A. A. Tirva

(57) ABSTRACT

A fanout connector assembly is provided for fiber optic cables each including a plurality of optical fibers. The assembly includes at least two fanout connectors each having a housing with a passage for receiving a fiber optic cable along an axis. A fanout member in the housing spreads the individual optical fibers of the cable transversely of the axis. Complementary interengaging stacking members on the housings of the two connectors align and hold the connectors in stacked relationship with one connector on top of the other connector. An individual connector includes a base housing and a cover with complementary interengaging strain relief members and complementary interengaging latch members therebetween. The strain relief members and the latch members are respectively interengaged automatically in response to mounting the cover on the base housing, but the strain relief members are at least partially interengaged prior to interengagement of the latch members.

14 Claims, 7 Drawing Sheets

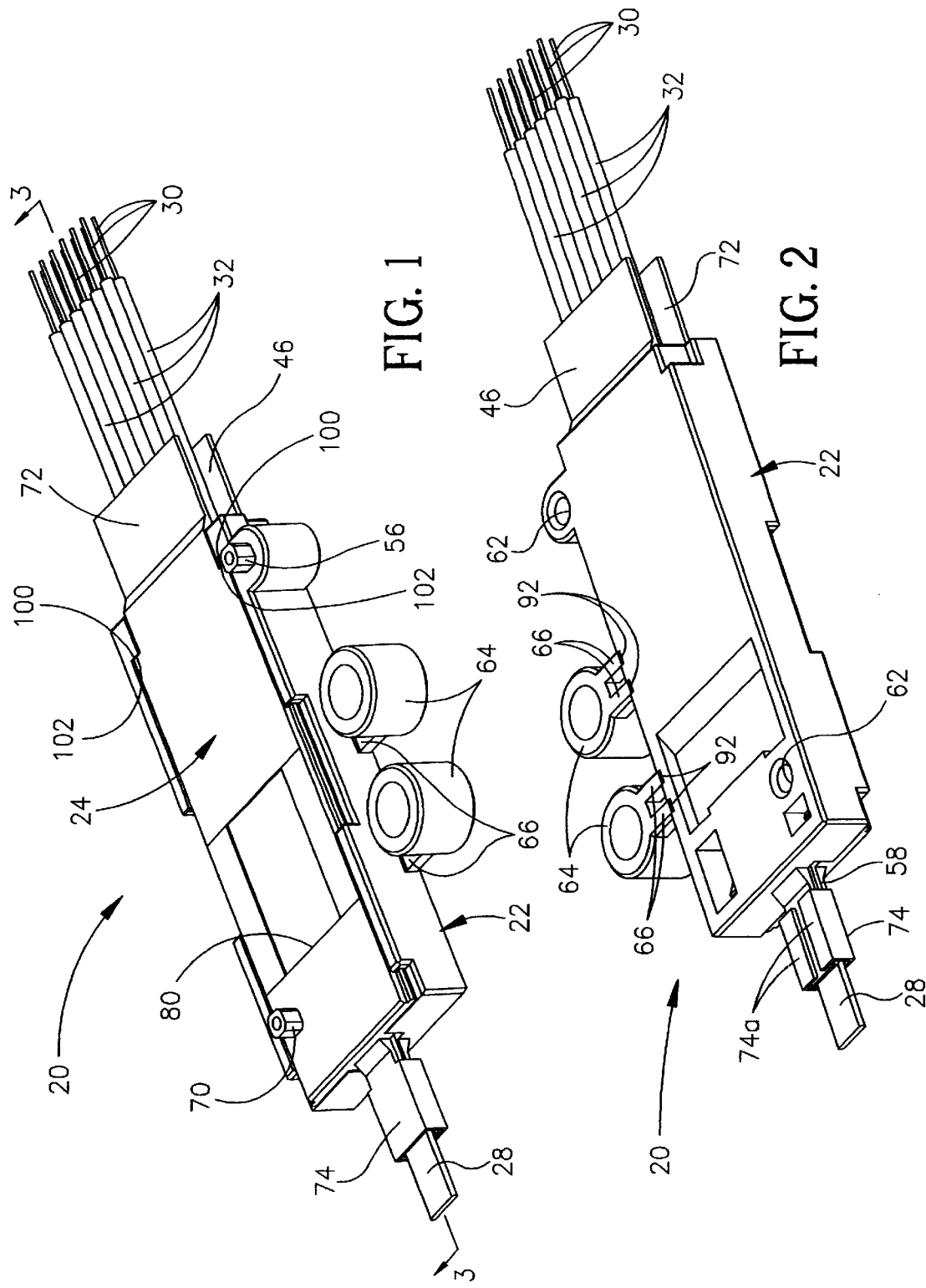

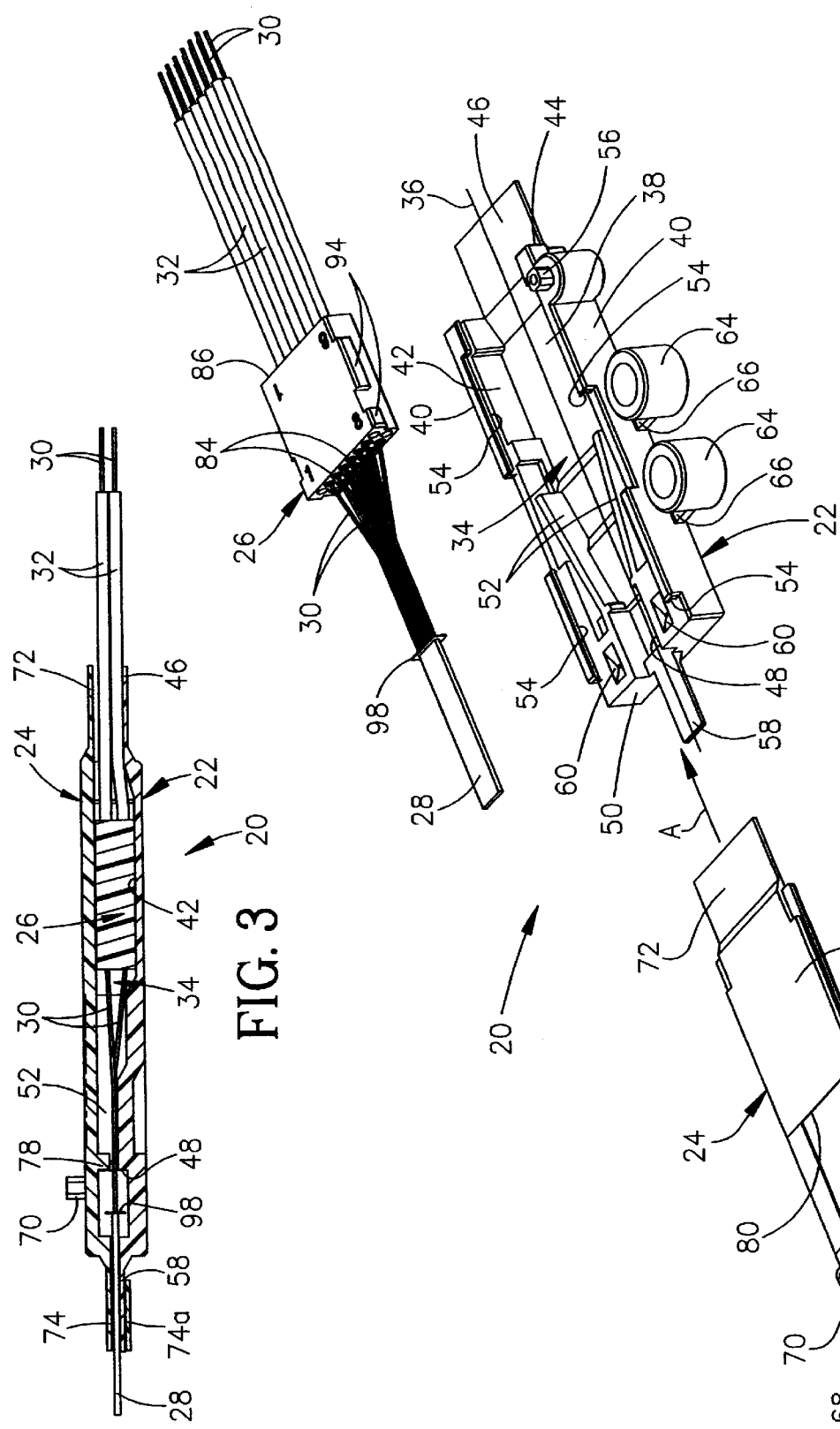

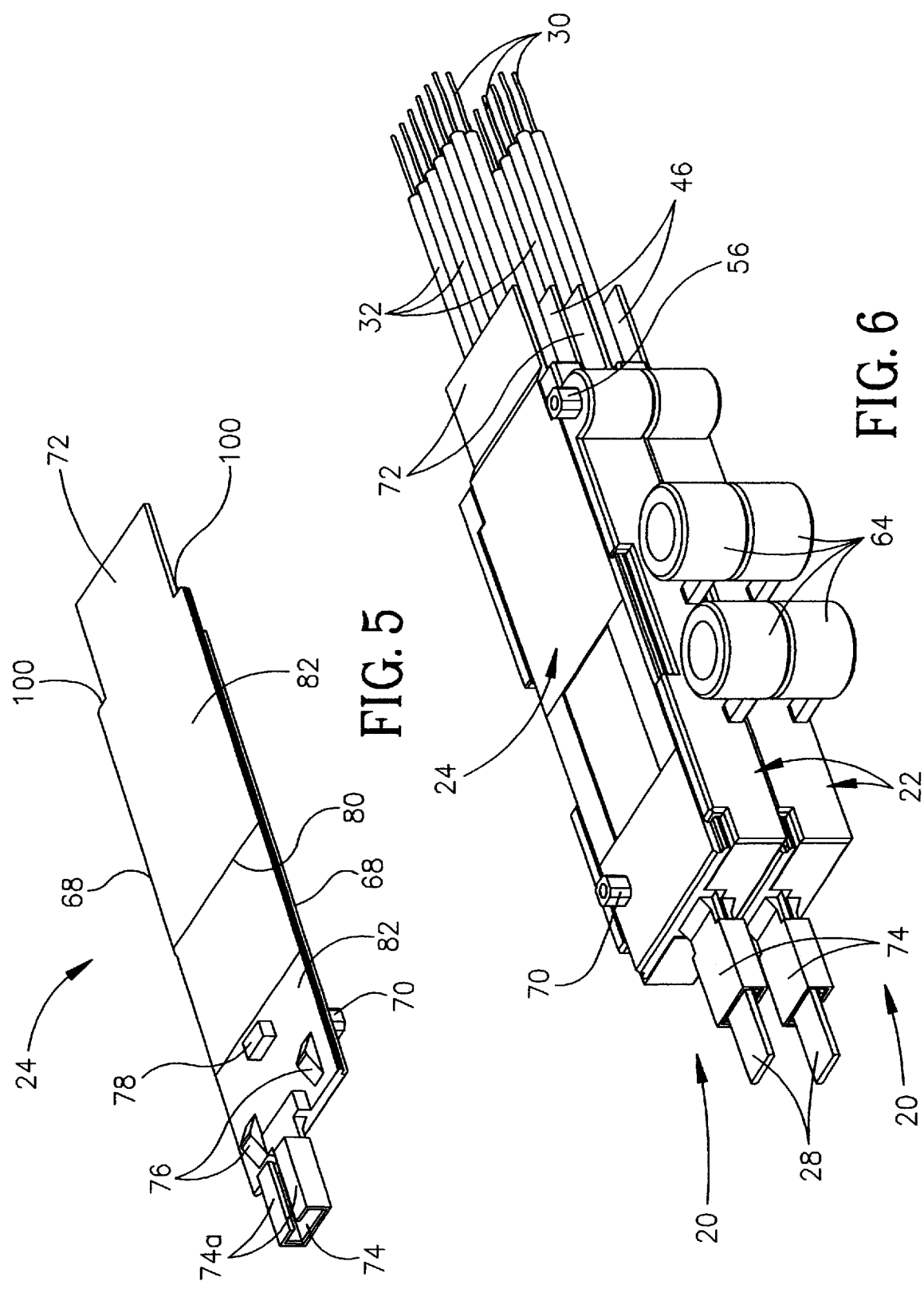

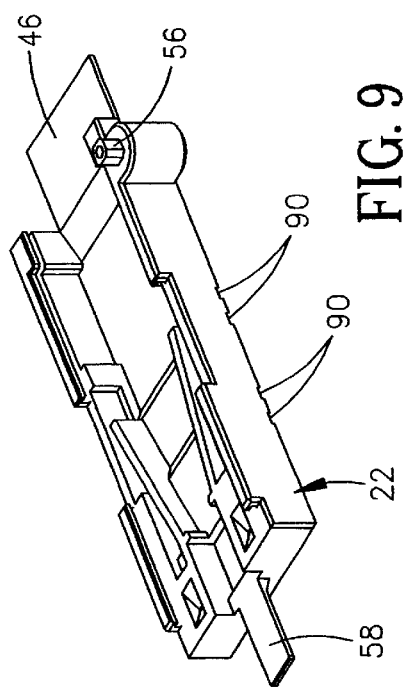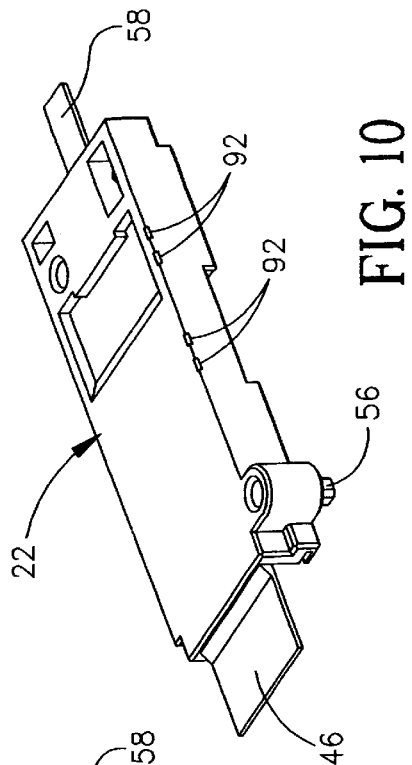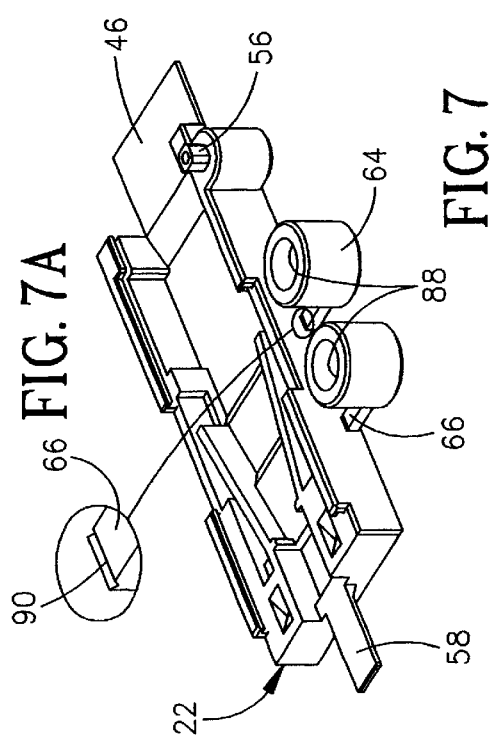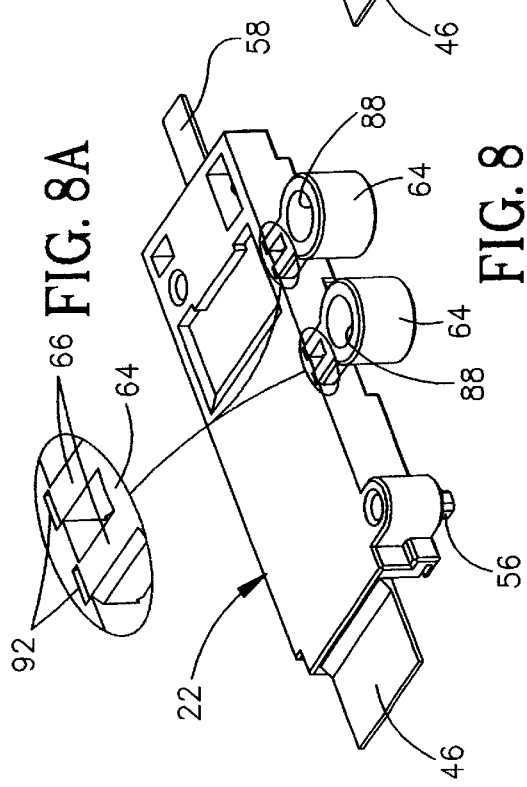

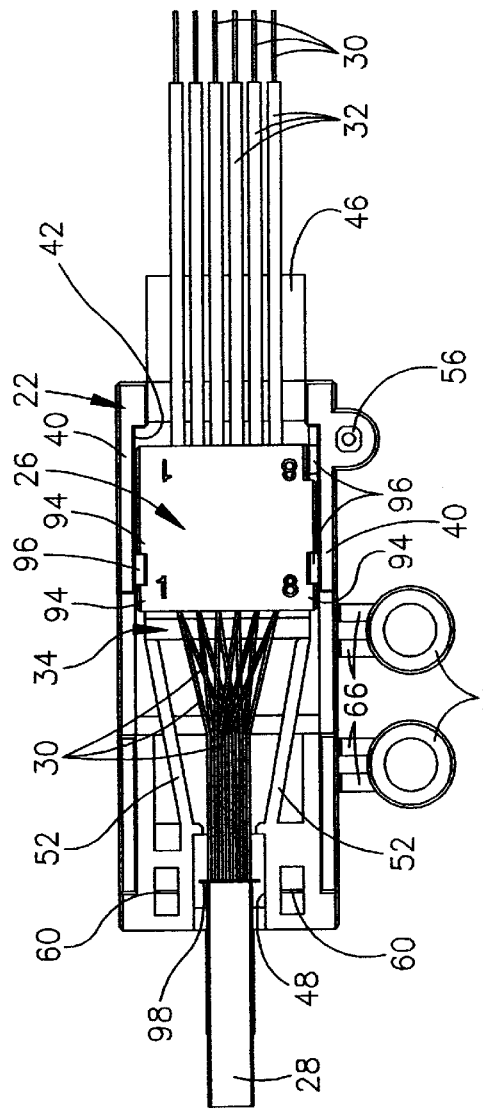
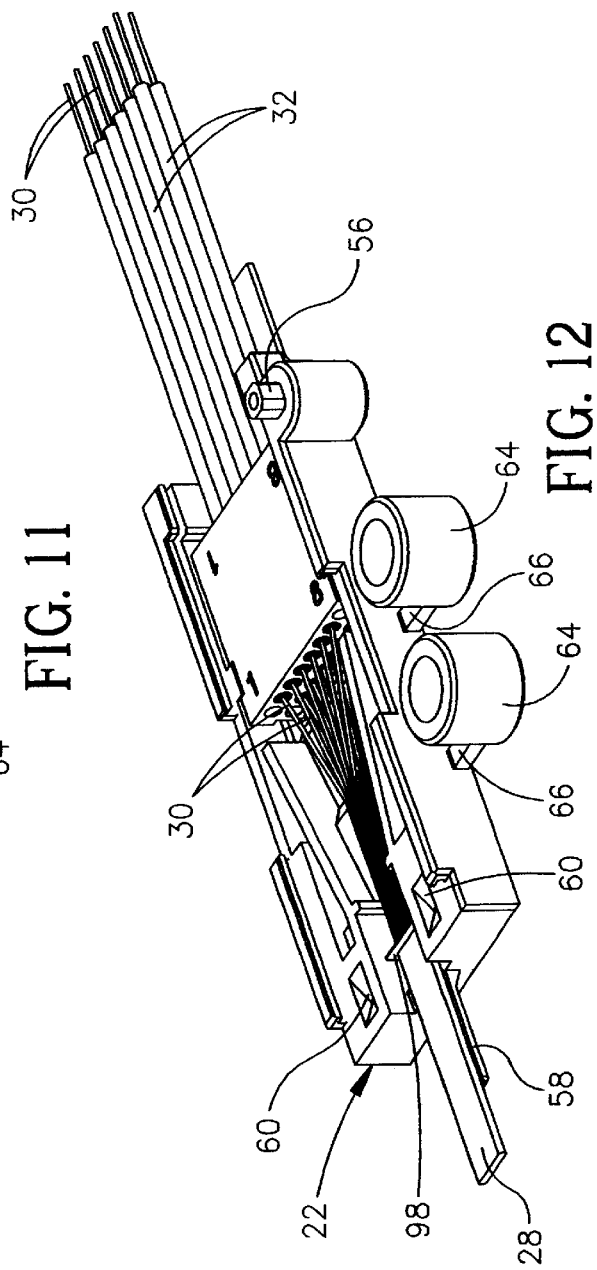
FIG. 11
FIG. 12

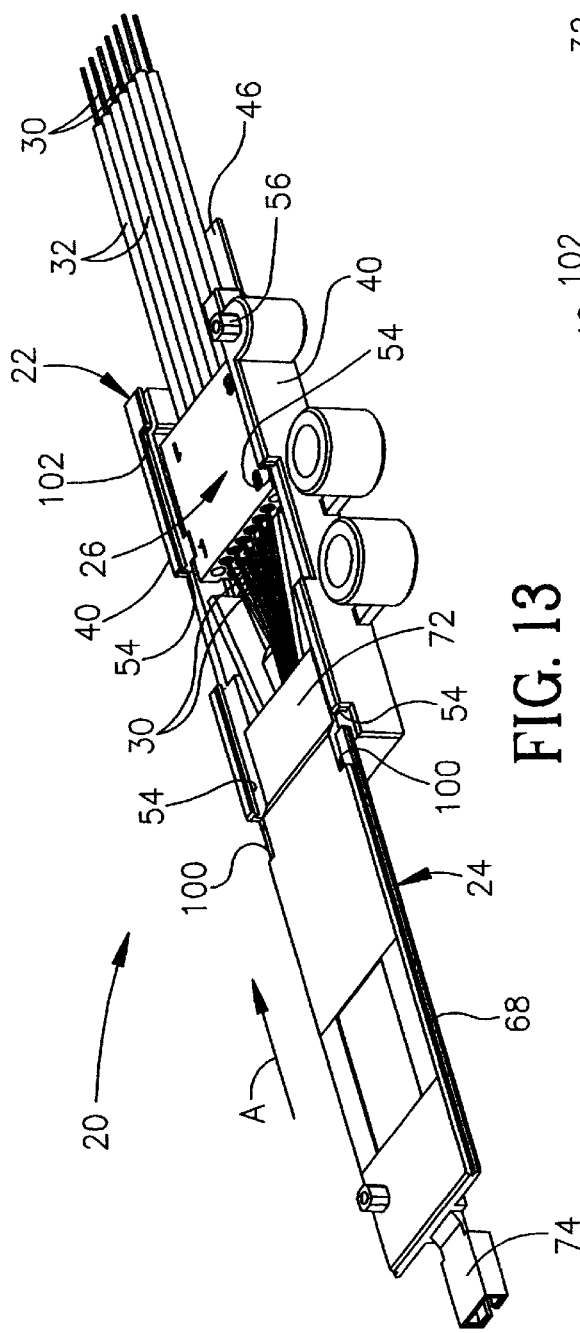
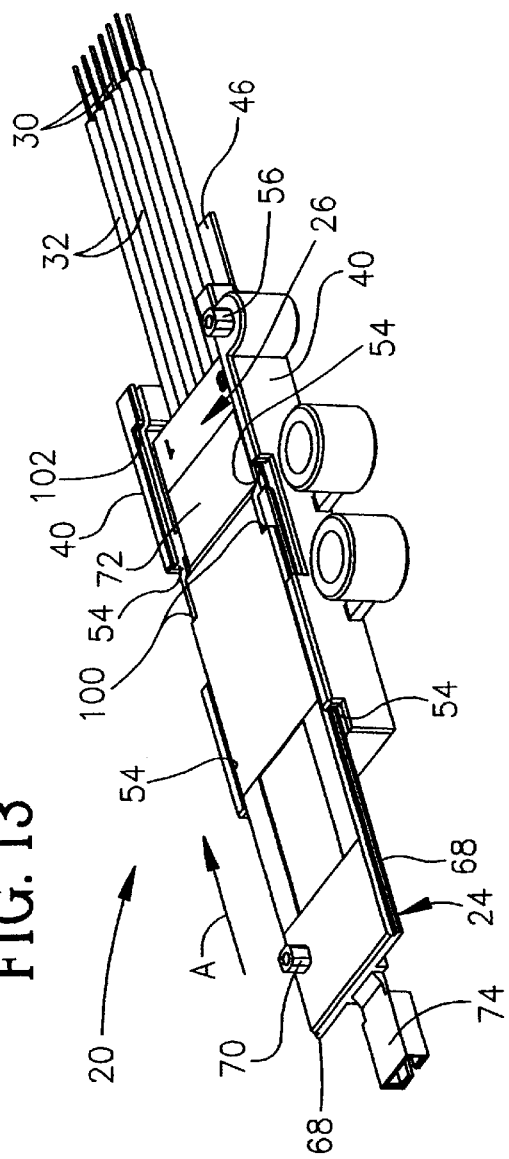
FIG. 13
FIG. 14

FIBER OPTIC CONNECTOR

FIELD OF THE INVENTION

This invention generally relates to the art of connector assemblies and, particularly, to a fiber optic connector assembly, but certain features of the invention may be equally applicable for use with other types of connectors such as electrical connectors.

BACKGROUND OF THE INVENTION

Fiber optic connectors of a wide variety of designs have been employed to terminate optical fiber cables and to facilitate connection of the cables to other cables or other optical fiber transmission devices. A typical fiber optic connector includes a ferrule which mounts and centers an optical fiber or fibers within the connector. The ferrule may be fabricated of such material as ceramics. A multi-fiber optic cable is terminated in the connector, and a plurality of individual optical fibers of the cable may be terminated in the ferrule. A popular type of fiber optic cable is a multi-fiber flat cable which conventionally is called a ribbon cable.

One specific type of fiber optic connector is a "fanout" connector which typically is used with a ribbon-type cable. The individual optical fibers of the cable are very closely spaced. A fanout connector includes a fanout means such as a fanout insert for receiving and spreading the individual fibers of the cable transversely thereof so that the fibers are more easily connectorized according to hardware interface requirements. Often, the individual fibers extend away from the fanout insert within a plurality of easily manipulatable tubes which also protect the fibers. The tubes often are color-coded and are permanently affixed to a fanout structure by, for example, heat shrinking. This type of attachment may degrade the temperature cycling performance by causing micro bending of the fibers. The present invention is directed to providing various improvements in connector assemblies, such as fiber optic connector assemblies, including fanout-type fiber optic connectors.

SUMMARY OF THE INVENTION

An object, therefore, of the invention is to provide a new and improved connector assembly, such as a fiber optic fanout connector, of the character described.

In the exemplary embodiment of the invention, a fanout connector assembly is provided for a fiber optic cable including a plurality of optical fibers. The assembly includes at least two fanout connectors each including a housing having a passage for receiving a fiber optic cable along an axis. The housing has a fanout member for spreading the individual optical fibers of the fiber optic cable transversely of the axis. Complementary interengaging stacking members are provided on the housing of the two connectors for aligning and holding the connectors in stacked relationship with one connector on top of the other connector.

As disclosed herein, the complementary interengaging stacking members comprise at least one mounting post on the housing of one of the connectors received in a mounting hole in the housing of the other connector. Preferably, a plurality of the mounting posts are received in a plurality of the mounting holes. The posts may be sized relative to the holes for receipt therein by a press-fit. The posts may also be adapted to be press fit into mounting holes in a printed circuit board.

According to one aspect of the invention, the housing for each connector includes a base housing and a cover with at least one of the mounting post and the mounting hole being on each of the base housing and cover. Preferably, the base housing and the cover of one connector each includes an upstanding mounting base, and the base housing of the other connector includes a pair of mounting holes for receiving the mounting posts. The cover is shown herein slidably mounted on the base housing generally parallel to the axis, whereby the cover is rendered immovable when the connectors are stacked.

According to another aspect of the invention, the base housing and the cover have complementary interengaging latch members for interengagement automatically in response to slidably mounting the cover onto the base housing. Complementary interengaging cable strain relief members also are provided between the base housing and cover for interengagement automatically in response to slidably mounting the cover onto the base housing. Preferably, the latch members and the strain relief members are located relative to each other whereby the strain relief members are at least partially interengaged prior to interengagement of the latch members.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a top perspective view of a fanout fiber optic connector embodying the concepts of the invention;

FIG. 2 is a bottom perspective view of the connector;

FIG. 3 is an axial section taken generally along line 3—3 of FIG. 1;

FIG. 4 is a top, exploded perspective view of the connector;

FIG. 5 is a bottom perspective view of the cover of the connector;

FIG. 6 is a top perspective view of a pair of the connectors in a stacked relation;

FIGS. 7 and 7A are perspective views showing the top weakened areas of the frangible webs for the mounting members;

FIGS. 8 and 8A are perspective views showing the bottom weakened areas for the frangible webs of the mounting members;

FIGS. 9 and 10 are top and bottom perspective views, respectively, of the base housing with the mounting members being broken-away therefrom;

FIG. 11 is a top plan view of the connector, with the cover removed;

FIG. 12 is a perspective view similar to the plan view of FIG. 11;

FIG. 13 is a perspective view showing the cover initially being assembled to the base housing;

FIG. 14 is a view similar to that of FIG. 13, with the cover slidably mounted further onto the base housing but not quite to its final position;

DETAILED DESCRIPTION OF THE PREFERRED EMBODIMENT

Figure 15:
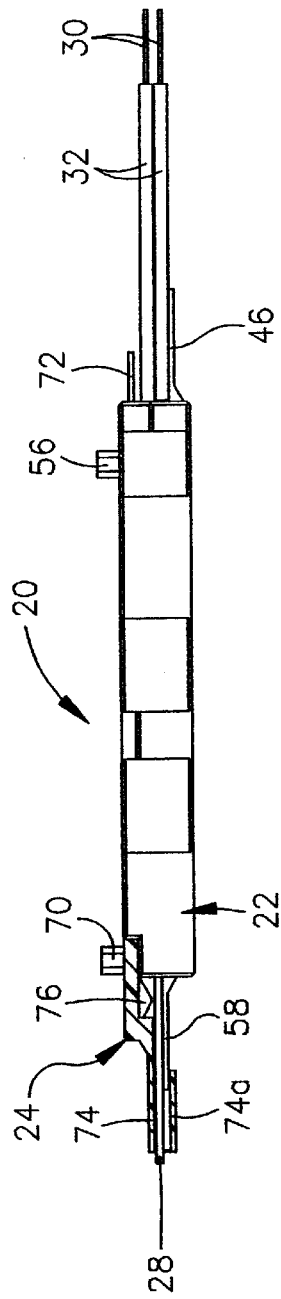
FIG. 15 is a side elevational view of the connector, partially in section, to show the interengaged strain relief means and latch means.

Referring to the drawings in greater detail, and first to FIGS. 1-4, the invention is embodied in a fanout connector, generally designated 20 and which is fabricated of three major components. As best seen in FIG. 4, those components include a base housing, generally designated 22, and a cover, generally designated 24, which is slidably mounted onto the base housing in the direction of arrow "A". The base housing and cover form a housing means for receiving a third major component, namely a fanout insert, generally designated 26. A fiber optic cable 28 includes a plurality of individual optical fibers 30 which extend through the fanout insert and through a plurality of tubes 32 projecting forwardly of the insert.

More particularly, base housing 22 of fanout connector 20 includes a through passage, generally designated 34, for receiving cable 28 and fibers 30 along an axis 36. The base housing is a one-piece structure unitarily molded of plastic material and includes a bottom wall 38 and a pair of upstanding side walls 40 which define a receptacle 42 which communicates with or is a part of through passage 34. The receptacle generally is at a front end 44 of the housing, and a bottom lip 46 projects forwardly of front end 44. An entrance section 48 of through passage 34 opens at a rear end 50 of the housing and through which cable 28 extends. The entrance section is enlarged relative to the dimensions of the cable so that the cable is freely positioned within the enlarged entrance section as best seen in FIG. 3. An intermediate section is defined by a pair of side walls 52 which gradually slope outwardly or diverge from entrance section 48 to receptacle 42. A plurality of guide rails 54 are located along the upper edges of side walls 40 of the base housing, with the guide rails opening inwardly toward axis 34.

Other features of base housing 22 include an upstanding octagonal mounting post 56, a rearwardly projecting strain relief tongue 58, a pair of upwardly opening latch recesses 60 (FIG. 4), a pair of bottom opening mounting holes 62 (FIG. 2) and a pair of cylindrical mounting members 64, all for purposes described hereinafter. Mounting members 64 are joined to one side wall 40 of the base housing by a pair of frangible webs 66.

Cover 24 of connector 20 is a generally flat, elongated or rectangular member having guide ribs 68 along opposite edges thereof. The cover is a one-piece structure unitarily molded of plastic material. Guide ribs 68 slide beneath guide rails 54 of base housing 22 when the cover is slidably mounted to the housing in the direction of arrow "A" (FIG. 4) as described hereinafter. The cover has an upstanding octagonal mounting post 70 similar to upstanding mounting post 56 of the base housing. The cover has a forwardly projecting top lip 72 similar to bottom lip 46 of the base housing. The cover has a rearwardly projecting strain relief shroud 74 which cooperates with strain relief tongue 58 of the base housing to provide a strain relief means for cable 28, as will be seen hereinafter.

Referring to FIG. 5, the bottom of cover 24 has a pair of integrally molded latch bosses 76 which latch within recesses 60 (FIG. 4) of the base housing. A stop 78 also projects from the bottom of the cover. Finally, the cover includes a transparent window 80 which affords visual inspection of the cable within the connector. The entire cover may be molded of substantially transparent plastic material which is texturized in areas 82 so that substantially the entire cover is opaque except for transparent window 80.

Referring to FIG. 4, fanout insert 26 is molded of plastic material and includes a plurality of through holes 84 which receive fibers 30 of cable 28 and which spread the individual fibers apart from each other transversely of axis 36. The number of through holes does not have to match the number of fibers of the cable. For instance, in the illustrated embodiment, there are sixteen through holes 84 and only fourteen fibers 30 of cable 28. As stated above, the fibers extend through a plurality of tubes 32 projecting from a front end 86 of the fanout insert. The rear ends of the tubes preferably are fixed, as by epoxy, within the front ends of through holes 84. The fiber ends project beyond the front ends of the tubes as seen in the drawings. The tubes provide both protection for the projecting fibers as well as means for readily manipulating the fibers. As seen in FIGS. 1-3, the tubes, themselves, are protected by forwardly projecting top lip 72 of the cover and bottom lip 46 of the base housing.

FIG. 6 shows how a plurality of connectors 20 can be mounted on top of each other in a stacked array. When one connector is mounted on top of another connector, mounting post 56 which projects upwardly from base housing 22 and mounting post 70 which projects upwardly from cover 24 of a bottom connector are inserted into mounting holes 62 (FIG. 2) in the bottom of the base housing of a top connector. Therefore, the cover of the bottom connector cannot move relative to the base housing thereof. The mounting posts may be sized for positioning into the mounting holes by a press-fit. Although FIG. 6 shows two connectors in a stacked array, of course more than two connectors can be stacked as described. Furthermore, the mounting posts 56 and 70 may be press fit into mounting holes in a printed circuit board (not shown).

FIGS. 7-10 show how cylindrical mounting members 64 can be brokenaway from base housing 22 for using the connector in applications wherein the connector is not mounted to a supporting structure. In other words, cylindrical mounting members 64 have through holes 88 (FIGS. 7 and 8) for receiving therethrough appropriate fasteners, such as rivets, screws or bolts, for fastening the connector to an appropriate support structure. When an application dictates that the connector be used as a stand-alone unit, mounting members 64 are broken-away from base housing 22. This is accomplished by using frangible webs 66 which join the mounting members to the base housing and which are much smaller than the mounting members. FIGS. 7 and 7A show that notches 90 are formed at the tops of the webs immediately adjacent the housing. FIGS. 8 and 8A show that notches 92 are formed at the bottoms of the webs immediately adjacent the housing. These notches weaken the junctures between the webs and the housing so that the webs readily break away from the housing leaving fairly clean breaking points as seen in FIGS. 9 and 10.

Referring to FIGS. 11 and 12 in conjunction with FIG. 4, fanout insert 26 includes a plurality of polarizing projections 94 on opposite sides thereof, and base housing 22 includes a plurality of polarizing projections 96 on the opposite sides of receptacle 42 defined by side walls 40. These complementary interengaging polarizing projections 94 and 96 define a tongue and groove arrangement at the sides of fanout insert 26 and the sides of receptacle 42 to ensure that the fanout insert is positioned in the receptacle only in a given orientation so that the fibers of cable 28 are oriented according to an expected scheme in which they have been threaded through the insert and through tubes 32.

At this point, it can be seen in FIGS. 4, 11 and 12 that a small tube or band 98 is positioned about cable 28 at a point where the outer cladding of the cable has been removed to expose individual fibers 30. This band may be fabricated of heat shrinkable material and heat shrunk about the cable at this point. The band prevents the fibers from fraying the outer cladding of the cable after they have been exposed for spreading by fanout insert 26. As seen in FIG. 3, the band is free to move within enlarged entrance section 48. This allows the cable and fibers to move axially of the entire connector within the limits of the band captured in the enlarged entrance section thereby improving temperature cycling performance. Stop 78 on the underside of cover 24 defines the forward limit of such movement.

After fanout insert 26, cable 28, fibers 30 and tubes 32 have been prepared as shown in FIG. 4, and after this subassembly has been inserted and polarized within base housing 22 as shown in FIGS. 11 and 12, cover 24 is assembled to the base housing as shown in FIGS. 13 and 14. Specifically, the cover is slidably mounted to the base housing in the direction of arrows "A". During mounting, guide ribs 68 at opposite edges of the flat cover slide beneath guide rails 54 along the top edges of side walls 40 of the base housing. The cover is slidably mounted to the housing until a pair of stops 100 at opposite sides of the cover abut against a pair of stops 102 at opposite sides of the base housing as seen in FIG. 1.

Once cover 24 is fully slidably mounted onto base housing 22 with stops 100 and 102 in abutment, two functions occur as best seen in FIG. 15. First, latch bosses 76 (FIG. 5) on the underside of cover 24 snap into latching interengagement with latch recesses 60 (FIG. 4) in the top of the base housing. Second, strain relief tongue 58 at the rear of the base housing enters strain relief shroud 74 at the rear of the cover. This sandwiches cable 28 between the tongue and the cover. As best seen in FIGS. 4 and 5, shroud 74 is flattened and is generally C-shaped to define a pair of bottom, inwardly directed flanges 74a. Tongue 58 also is flat, whereby ribbon cable 28 is sandwiched between the flat tongue and the flat top of the shroud, with flanges 74a of the shroud interengaging with the bottom of the tongue. The shroud is joined to the cover by a thin web 74b. With the cover and the base housing being fabricated of plastic material, web 74b of shroud 74 and tongue 58 are flexible whereby the interengaged strain relief means provide strain relief for the cable. The size and location of latch bosses 76 and latch recesses 60 in relation to tongue 58 and shroud 74 preferably should be such that the tongue enters the shroud before the latch bosses of the cover engage the base housing which, otherwise, might move the tongue and shroud out of alignment. This can be seen in FIG. 15 where tongue 58 has entered shroud 54 before latch bosses 76 engage the housing for movement into the latch recesses.

Figure 16:
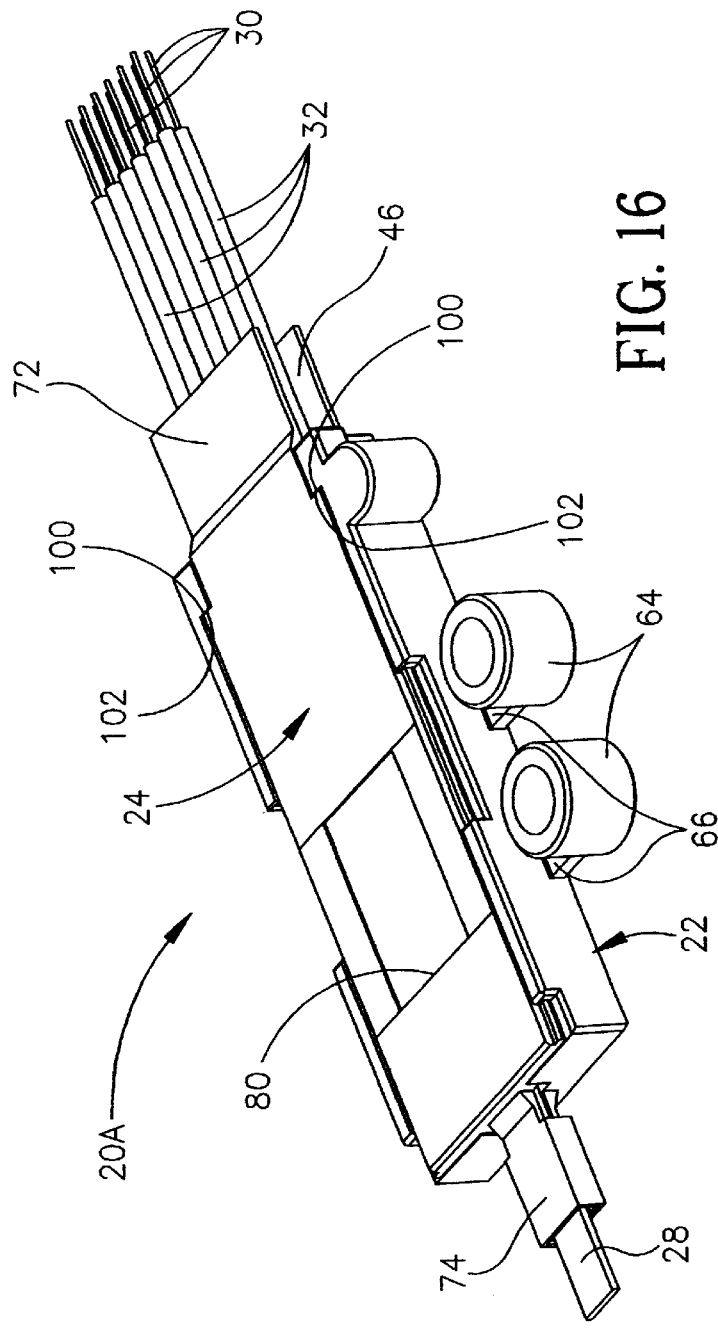
FIG. 16 is a perspective view similar to that of FIG. 1, but showing a non-stackable embodiment of the connector.

Finally, FIG. 16 shows a connector 20A which does not include mounting post 56 (FIG. 4) on base housing 22 nor mounting post 70 (FIG. 4) on cover 24. This simply shows that the connector can be made for non-stackable applications.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A fanout connector assembly for fiber optic cables each including a plurality of optical fibers, comprising:

at least two fanout connectors each including
    housing means having a passage for receiving a fiber optic cable along an axis, said housing means including a base housing and a cover, and
    fanout means in the housing means for spreading the individual optical fibers of the fiber optic cable transversely of said axis; and
    complementary interengaging stacking means on the housing means of the two connectors for aligning and holding the connectors in stacked relationship with one connector on top of the other connector, said stacking means comprising a plurality of mounting posts received in respective mounting holes with at least one mounting post and one mounting hole being on each of the base housing and cover.

2. The fanout connector assembly of claim 1 wherein said mounting posts are sized relative to the mounting holes for receipt therein by a press-fit.

3. The fanout connector assembly of claim 1 wherein the base housing and the cover of said other connector each includes an upstanding mounting post, and the base housing of said one connector includes a pair of mounting holes for receiving the mounting posts.

4. A fanout connector for a fiber optic cable including a plurality of optical fibers, comprising:

a base housing having a passage for receiving the cable and fibers along an axis;
a cover slidably mounted on the base housing in a direction generally parallel to said axis;
fanout means in the base housing for spreading the individual optical fibers of the fiber optic cable transversely of said axis;
complementary interengaging latch means between the base housing and cover for interengagement automatically in response to slidably mounting the cover onto the base housing;
complementary interengaging cable strain relief means between the base housing and cover for interengagement automatically in response to slidably mounting the cover onto the base housing; and
said latch means and strain relief means being located relative to each other whereby the strain relief means are at least partially interengaged prior to interengagement of the latch means.

5. The fanout connector of claim 4 wherein said complementary interengaging cable strain relief means include a shroud on one of the base housing and cover and a tongue on the other of the base housing and cover, the tongue being slidable into the shroud when the cover is slidably mounted on the base housing, with the fiber optic cable being sandwiched between the shroud and the tongue.

6. The fanout connector of claim 5 wherein said shroud is generally C-shaped.

7. The fanout connector of claim 6 wherein said C-shaped shroud has a flattened configuration and said tongue is generally flat for receiving a ribbon-type fiber optic cable therebetween.

8. The fanout connector of claim 7 wherein said complementary interengaging latch means include a latch boss on one of the base housing and cover snap-fit into a latch recess in the other of the base housing and cover.

9. A connector for a transmission cable, comprising:
a first housing part and a second housing part mounted on the first housing part for receiving the cable therebetween;
complementary interengaging latch means between the housing parts for interengagement automatically in response to mounting the second housing part on the first housing part;

complementary interengaging cable strain relief means between the housing parts for interengagement automatically in response to mounting the second housing part on the first housing part; and said latch means and strain relief means being located relative to each other whereby the strain relief means are at least partially interengaged prior to interengagement of the latch means.

10. The connector of claim 9 wherein said second housing part is slidably mounted on the first housing part.

11. The connector of claim 10 wherein said complementary interengaging cable strain relief means include a shroud on one of the housing parts and a tongue on the other of the housing parts, the tongue being slidable into the shroud when the second housing part is mounted on the first housing part, with the transmission cable being sandwiched between the shroud and the tongue.

12. The connector of claim 11 wherein said shroud is generally C-shaped.

13. The connector of claim 12 wherein said C-shaped shroud has a flattened configuration and said tongue is generally flat for receiving a ribbon-type fiber optic cable therebetween.

14. The connector of claim 13 wherein said complementary interengaging latch means include a latch boss on one of the housing parts snap-fit into a latch recess in the other of the housing parts.

* * * * *